United States Patent
Gao

(10) Patent No.: US 10,305,318 B2
(45) Date of Patent: May 28, 2019

(54) WEARABLE DEVICE, CHARGING DEVICE FOR THE WEARABLE DEVICE, AND CHARGING SYSTEM

(71) Applicant: BOE TECHNOLOGY GROUP CO., LTD., Beijing (CN)

(72) Inventor: Jian Gao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 140 days.

(21) Appl. No.: 15/506,089

(22) PCT Filed: Feb. 18, 2016

(86) PCT No.: PCT/CN2016/073982
§ 371 (c)(1),
(2) Date: Feb. 23, 2017

(87) PCT Pub. No.: WO2017/054395
PCT Pub. Date: Apr. 6, 2017

(65) Prior Publication Data
US 2018/0219408 A1    Aug. 2, 2018

(30) Foreign Application Priority Data

Sep. 29, 2015  (CN) .......................... 2015 1 0633277

(51) Int. Cl.
*H02J 7/35* (2006.01)
*G04G 19/00* (2006.01)

(52) U.S. Cl.
CPC ................ *H02J 7/35* (2013.01); *G04G 19/00* (2013.01)

(58) Field of Classification Search
USPC ....................................................... 320/137
See application file for complete search history.

(56) References Cited

U.S. PATENT DOCUMENTS

2015/0220109 A1 *  8/2015  von Badinski ......... G01P 15/00
                                                            340/539.12

FOREIGN PATENT DOCUMENTS

CN    102035602 A    4/2011
CN    102636986 A    8/2012
(Continued)

OTHER PUBLICATIONS

Second Chinese Office Action dated Oct. 11, 2017.
International Search Report dated Jul. 4, 2016.
Chinese Office Action dated Feb. 16, 2017.

*Primary Examiner* — Bryce M Aisaka
(74) *Attorney, Agent, or Firm* — Dilworth & Barrese, LLP.; Michael J. Musella, Esq.

(57) ABSTRACT

A wearable device, a charging device for the wearable device and a charging system are disclosed. The wearable device includes a display module and a battery module, and further includes: an optical signal detection module, which is disposed outside the display module and is configured for detecting ambient light; an optical signal demodulation module, which is configured for demodulating modulated light in the ambient light to obtain demodulated light; a photoelectric conversion module, which is configured for converting the demodulated light into an electrical signal. The battery module can receive the electrical signal, so as to be charged by the electrical signal. Without the need to change the existing habits of users, the wearable device can realize charging with the modulated light during a standby state or during being used indoors. Therefore, the charging efficiency of the wearable device is improved.

14 Claims, 4 Drawing Sheets

(56) References Cited

FOREIGN PATENT DOCUMENTS

| | | |
|---|---|---|
| CN | 202524125 U | 11/2012 |
| CN | 103457333 A | 12/2013 |
| CN | 103822660 A | 5/2014 |
| CN | 104184519 A | 12/2014 |
| CN | 104739424 A | 7/2015 |
| CN | 104898407 A | 9/2015 |
| CN | 105141025 A | 12/2015 |
| WO | 2012035738 A1 | 3/2012 |

* cited by examiner

WEARABLE DEVICE, CHARGING DEVICE FOR THE WEARABLE DEVICE, AND CHARGING SYSTEM

The application claims priority to the Chinese patent application No. 201510633277.2, filed Sep. 29, 2015, the entire disclosure of which is incorporated herein by reference as part of the present application.

TECHNICAL FIELD

Embodiments of the present disclosure belong to the electronic technology field, specifically relate to a wearable device, a charging device for the wearable device, and a charging system.

BACKGROUND

A wearable device refers to an intelligent mobile device which can be directly worn by a human body or can be integrated in clothes, accessory, or the like, and can record data such as data of human body. For example, the wearable device can be a smart band, a smart watch, or the like.

Because the size of a wearable device is small, the battery capacity is small. Therefore, the battery life of the wearable device is poor, and frequent charging is needed (for example, charging one time or many times per day). Generally, the wearable device is charged through the following method: converting an alternating current (for example, 220V or 110V) into a direct current (for example, 5V) by a separated charging device, and then charging the battery with the direct current. However, charging through the above method is not convenient because frequent charging is needed for the wearable device. Therefore, in order to address the issue of charging inconvenience, the wearable device equipped with a solar cell is also provided now. However, the charging efficiency of the wearable device equipped with the solar cell is low because of the adverse effect of the ambient stray light, and therefore, it's not possible to fully charge the battery of the wearable device in a very short time.

SUMMARY

To address the above disadvantages existing in the state of art, embodiments of the present disclosure provide a wearable device, a charging device for the wearable device, and a charging system, to solve the problems of low charging efficiency and poor charging convenience of the battery module of the wearable device.

In one aspect, an embodiment of the present disclosure provides a wearable device, which comprises: an optical signal detection module configured for detecting ambient light; an optical signal demodulation module configured for demodulating modulated light in the ambient light to obtain demodulated light; a photoelectric conversion module configured for converting the demodulated light into an electrical signal; and a battery module configured for receiving the electrical signal, so as to be charged with the electrical signal.

The wearable device can further comprises a display module configured for displaying information for a user of the wearable device, wherein, the optical signal detection module is disposed outside the display module.

An upper surface of the optical signal detection module can protrude from a plane where the display module is disposed.

The wearable device can further comprises a rectification module which is disposed between the photoelectric conversion module and the battery module and is configured for rectifying the electrical signal provided by the photoelectric conversion module, so as to adapt to a rated voltage of the battery module.

The optical signal detection module can comprise: an optical signal sensing component, a control component, and an optical signal acquisition component; the optical signal sensing component is configured for sensing the ambient light; the control component is configured for controlling the optical signal acquisition component to collect the ambient light when a light intensity of the ambient light sensed by the optical signal sensing component is larger than a preset threshold.

The optical signal sensing component can comprise a photodiode.

The wearable device can be a smart watch.

In another aspect, an embodiment of the present disclosure further provides a charging device for the above wearable device which comprises: a light source configured for providing an optical signal; an optical signal modulator configured for receiving and modulating the optical signal, so as to convert the optical signal into modulated light; and a sending module configured for sending the modulated light, which is served as part of the ambient light.

The light source can be a light-emitting diode.

In further another aspect, an embodiment of the present disclosure further provides a charging system which comprises a wearable device and a charging device for the wearable device; the charging device comprises a light source configured for providing an optical signal; an optical signal modulator configured for receiving and modulating the optical signal, so as to convert the optical signal into modulated light; and a sending module configured for sending the modulated light, which is served as part of the ambient light; the wearable device comprises: an optical signal detection module configured for detecting ambient light; an optical signal demodulation module configured for demodulating the modulated light in the ambient light to obtain demodulated light; a photoelectric conversion module configured for converting the demodulated light into an electrical signal; and a battery module configured for receiving the electrical signal, so as to be charged with the electrical signal.

The wearable device provided by the present disclosure can collect and demodulate the optical signal, or even can reuse light rays emitted from its display module; therefore, rapid charging of the battery module of the wearable device can be realized. Without need to change existing habits of users, the wearable device can realize rapid charging with the modulated light during a standby state or during being used indoors. Therefore, the charging efficiency of the wearable device is improved, and the problem of the poor endurance of the battery module of the wearable device is effectively solved.

REFERENCE NUMERAL

1—smart watch; 2—light source; 21—LED light; 22—display device; 11—optical signal detection module; 12—optical signal demodulation module; 13—photoelectric conversion module; 14—rectification module; 15—battery module; 16—display module; 17—wristband.

DETAILED DESCRIPTION

In order to make those skilled in the art can have a better understanding of the technical solution of the present disclosure, a wearable device, a charging device for the wearable device, and a charging system provided by embodiments of the present disclosure will be described in detail with reference to drawings and embodiments.

The wearable device can be a smart watch, a health band, a blood pressure meter, a sports wristband or the like.

In the following, the wearable device is a smart watch, which is taken as an example for description.

First Embodiment

The present embodiment provides a wearable device, which can make the battery of the wearable device fully be charged in a very short time, and therefore can enable itself to have a better battery life. The problem of the wearable device being susceptible to power shortage can be greatly ameliorated. Good performance of the function of the wearable device can be guaranteed. In the following, the smart watch is taken as an example for the wearable device.

Figure 1:
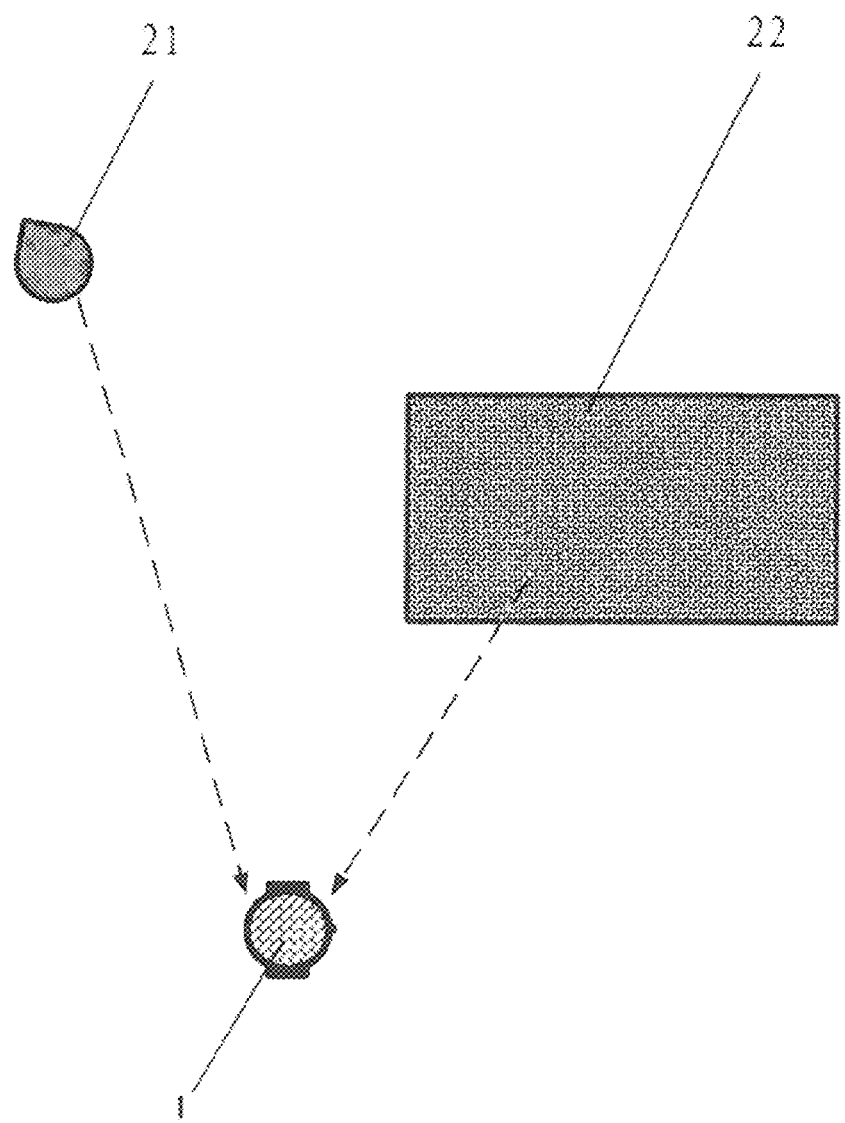
FIG. 1 is a schematic diagram of a charging principle of a wearable device provided by the present disclosure.

Firstly, a charging principle of the wearable device provided by the present disclosure is briefly described with reference to FIG. 1. FIG. 1 is a schematic diagram of the charging principle of the wearable device provided by the present embodiment. In FIG. 1, a smart watch 1 serves as a wearable device, an LED light 21 serves as a light source and a smart television/display device 22 are illustrated. The LED light 21 and a display panel of the smart television/display device 22 emit modulated light. With function modules which will be detailed described in the following, the smart watch 1 can collect ambient light, demodulate the modulated light in the ambient light to obtain demodulated light, convert the demodulated light into an electrical signal, and charge the battery of the smart watch 1 with the electrical signal. Thereby, the smart watch 1 can be conveniently and efficiently charged, and the duration time of the smart watch 1 is prolonged.

Figure 2A:
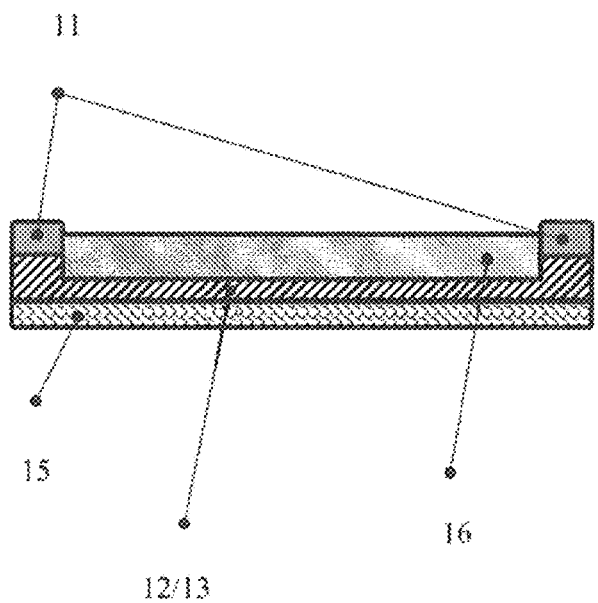
FIG. 2A is a cross-sectional view of a smart watch provided by a first embodiment of the present disclosure.
Figure 2B:
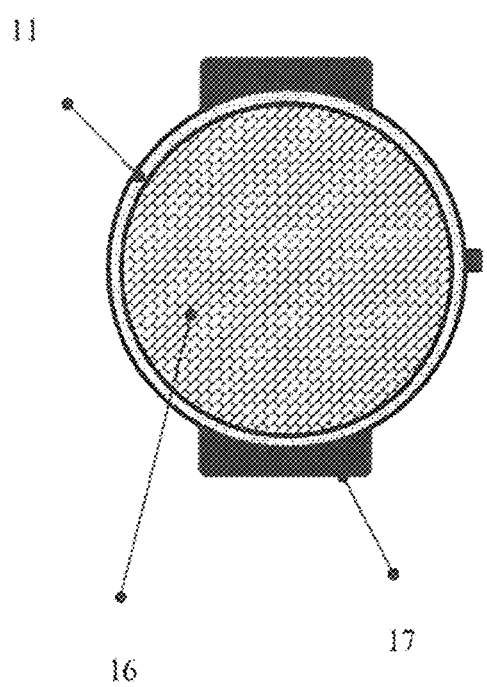
FIG. 2B is a plan view of the smart watch provided by the first embodiment of the present disclosure.

FIG. 2A is a cross-sectional view of the smart watch provided by the present embodiment, and FIG. 2B is a plan view of the smart watch 1. As illustrated in FIG. 2A and FIG. 2B, the smart watch 1 includes: a display module 16 configured for displaying information for a user of the smart watch 1; and a battery module 15 configured for providing power for the smart watch 1. As that will be detailed described in the following, the smart watch 1 can collect the ambient light, and can convert the light energy of the ambient light into electrical energy which can constantly charge the battery module 15; therefore, the smart watch 1 can have sufficient power for a long time.

Figure 3:
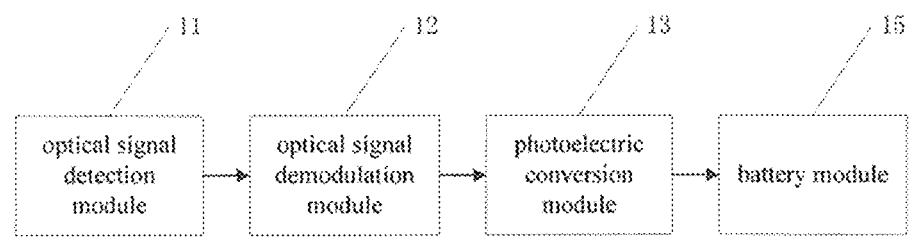
FIG. 3 is a function module diagram of the smart watch provided by the first embodiment of the present disclosure.

FIG. 3 is a function module diagram of the smart watch 1 provided by the present embodiment. As illustrated in FIG. 3, the smart watch 1 can include an optical signal detection module 11 configured for detecting ambient light; an optical signal demodulation module 12 configured for demodulating modulated light in the ambient light to obtain demodulated light, so as to further remove ambient stray light incorporated into the ambient light in a light transmission process; a photoelectric conversion module 13 configured for converting the demodulated light into an electrical signal; and a battery module 15 configured for receiving the electrical signal so as to be charged with the electrical signal.

The optical signal detection module 11 herein is specialized in detecting the ambient light. Because the ambient stray light is removed, the light with higher purity can be obtained, and the light efficiency can be improved. Specifically, the optical signal detection module 11 includes an optical signal sensing component, a control component, and an optical signal acquisition component; the optical signal sensing component is configured for sensing the ambient light; the control component is configured for controlling the optical signal acquisition component to collect the ambient light when the light intensity of the ambient light sensed by the optical signal sensing component is larger than a preset threshold.

The optical signal sensing component includes a photodiode or another photoelectric sensing component. Photodiode is also called photoelectric diode. Because the photocurrent generated by the photodiode varies with the intensity of the incident light, a voltage of the circuit where the photodiode is disposed can be controlled through controlling the light intensity of the incident light. Generally, in the case of no incident light, a very small amount of reverse saturation leakage current (i.e., dark current) occurs in the photodiode, and the photodiode is in a cut-off state; in the case of the photodiode is irradiated by the incident light, the amount of reverse saturation leakage current is greatly increased, and a photocurrent is formed. In practice, photodiodes or other photoelectric sensing devices can be adopted according to the actual situation, which is not limited herein.

With respect to the concrete structure of the smart watch, for example, an upper surface of the optical signal detection module 11 protrudes from a plane where the display module 16 is disposed, that is, the upper surface of the optical signal detection module 11 protrudes from an upper surface of the display module 16. With reference to FIG. 2A and FIG. 2B, the plane where the display module 16 is disposed is slightly lower than the optical signal detection module 11. Applying of the structure of the optical signal detection module 11 which protrudes from a plane where the display module 16 is disposed favors the collection of the optical signal emitted from the display module 16 of the smart watch 1, so as to reuse the light emitted from the display module 16 of the smart watch 1.

For example, as illustrated in FIG. 2A, the optical signal demodulation module 12 and the photoelectric conversion module 13 are integratedly formed, and an upward extension portion is formed along an edge of the display module 16; the optical signal detection module 11 is disposed on the extension portion; and the battery module 15 is disposed below the optical signal demodulation module 12 and the photoelectric conversion module 13. With the above structure, the structure of the smart watch is enabled to become compact, while the size of the smart watch is not necessary to be changed, and the small size and the portability of the smart watch can be guaranteed.

As a preferable example of the embodiment, a light source unit matching with the smart watch can be provided in certain circumstances, thereby a charging device matching with the smart watch is provided. The light source unit further includes an optical signal modulator on the basis of the light-emitting component that is originally included; and the optical signal modulator is separately disposed outside the smart watch. Because the light source unit and the light source unit that match with each other are applied, and the optical signal modulator is separately disposed outside the smart watch, the optical signal emitted by the light source unit can be appropriately modulated according to practical situations. Because the ambient stray light is removed, the smart watch can be fully charged with high efficiency in a short time, and the charging efficiency is further improved.

Correspondingly, the embodiment further provides a charging device (not illustrated in FIG. 2A or FIG. 2B) suitable for the smart watch 1. The charging device includes: a light source configured for providing an optical signal, the light source herein including a light-emitting diode (LED); an optical signal modulator configured for receiving and modulating the optical signal, so as to convert the optical signal into modulated light; and a sending module configured for sending the modulated light which is served as part of the ambient light, so as to detect the modulated light by the optical signal detection module of the wearable device. For example, a corresponding sending module is provided for the optical signal modulator, the sending module can be a light-emitting diode, so as to guarantee a high light transmitting efficiency; therefore almost full transmission of the modulated light to the optical signal detection module 11 can be guaranteed, and the received light can be fully converted into electrical energy.

The function of the optical signal modulator is, for example, to remove other optical signal noise except the white light in the environmental light, so as to obtain the white light signal to be transmitted to the optical signal detection module 11. Generally, the light emitted from the display screen is modulated light, and the light source such as portable table lamp or small flashlight can emit the white light signal through the modulation of the optical signal modulator. Therefore, the interference from the surrounding optical signal in the transmission process is reduced, the optical transmission efficiency is increased, and the received white light signal can be used to charge the smart watch. By applying the optical signal modulator disposed outside the smart watch, the smart watch can become more compact and of less weight, and is convenient to be worn while the utility rate of light and charge effect are guaranteed.

Specifically, the optical signal modulator includes a light noise reduction circuit which is transparent to the white light. The light noise reduction circuit can be realized by applying an adjusting method of anti-multipath interference capability and high spectrum using efficiency. For example, by applying a single carrier frequency domain equalization circuit, the effect of attenuation of the light intensity signal in the transmission process is minimized, the light transmission efficiency is increased, and therefore, the reliability of the system is improved.

Figure 5:
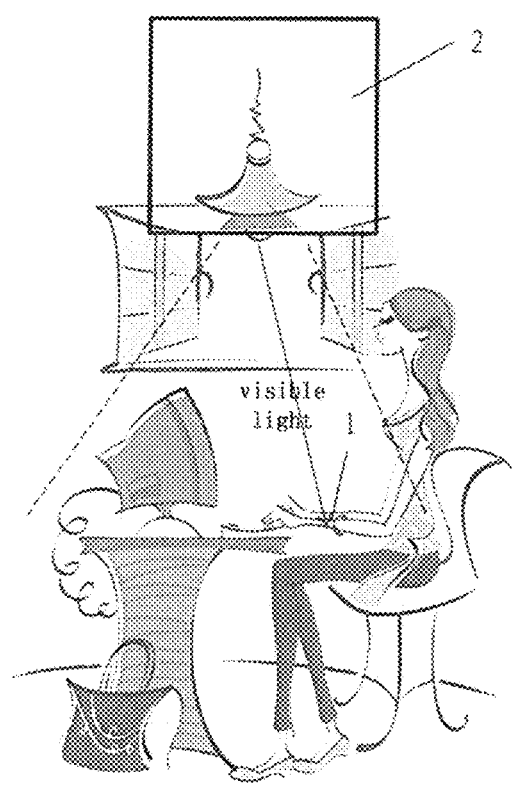
FIG. 5 is an application schematic diagram of the wearable device provided by an embodiment of the present disclosure in a smart home scenario.

FIG. 5 illustrated an application scenario of the smart watch provided by an embodiment. For example, with reference of FIG. 5, in a smart home scenario, the visible light emitted from a light source 2 used indoors irradiates on the smart watch 1 after being modulated by the optical signal modulator, and can be used to charge the smart watch 1. For the smart watch 1, the optical signal detection module 11 is configured for detecting the ambient light and collecting the modulated light modulated by the light source 2. The modulated light is demodulated by the optical signal demodulation module 12 and demodulated light is obtained. The demodulated light is converted into an electrical signal through the conversion of the photoelectric conversion module 13, and the electrical signal is provided to the battery module 15 to charge the battery module 15 with high efficiency, and the battery life of the battery module 15 is improved. The using time of the smart watch can be greatly prolonged, the problem of low charging efficiency and short battery life of the battery module of the wearable device in the prior art is solved.

For other wearable devices such as a health band, a blood pressure meter, a sport wristband or the like, the charging function structure and charging principle is same as the exemplary charging function structure and charging principle of the smart watch provided by the present embodiment, no further description will be given herein.

The wearable device provided by the present disclosure can collect and demodulate the optical signal, or even can reuse light rays emitted from its display module. Therefore, rapid charging of the battery module of the wearable device can be realized and long battery life of the wearable device can be guaranteed. Without the need to change the existing habits of users, the wearable device can realize high efficiency charging with the modulated light during a standby state or during being used indoors. Therefore, the problems of low charging efficiency, low battery life and charging inconvenience of the battery module of the wearable device are effectively solved, and the using time of the smart watch is prolonged.

Second Embodiment

The present embodiment provides a wearable device, which has a long battery life. The drawbacks of the low charging efficiency, low battery life and charging inconvenience of the wearable device can be greatly ameliorated, and full performance of the function of the wearable device can be guaranteed.

Figure 4:
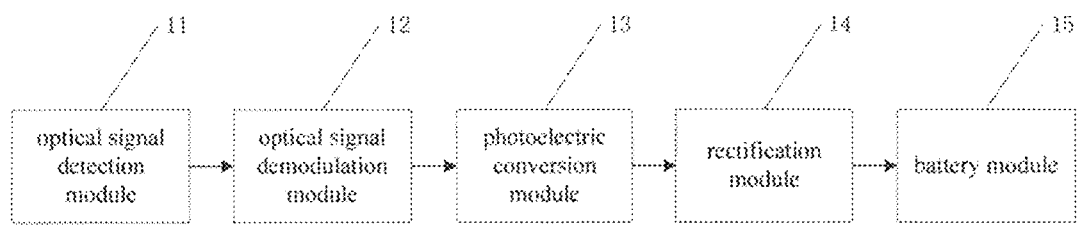
FIG. 4 is a function module diagram of the smart watch provided by a second embodiment of the present disclosure.

In the following, the wearable device of the present embodiment will be described while still taking the smart watch as an example. FIG. 4 is a function module diagram of the smart watch provided by the present embodiment. As illustrated in FIG. 4, the difference between the smart watch in the present embodiment and the smart watch in the first embodiment is that the smart watch further includes a rectification module 14 provided between the photoelectric conversion module 13 and the battery module 15, and the rectification module 14 is configured for rectifying the electrical signal provided by the photoelectric conversion module 13, so as to adapt to a rated voltage of the battery module 15. The wearable device of the present embodiment is especially suitable for the situation that the electrical energy obtained by the optical signal sensing component of the optical signal detection module 11 exists in a form of AC voltage or AC current.

For the smart watch in the present embodiment, the optical signal detection module 11 detects and collects the ambient light; the optical signal demodulation module 12 demodulates the modulated light in the ambient light to obtain demodulated light; a photoelectric conversion module 13 converts the demodulated light into an electrical signal, and the electrical signal herein is an alternating current (AC) signal; and a rectification module 14 is configured for rectifying the electrical signal provided by the photoelectric conversion module 13 to adapt to a rated voltage of the battery module 15, and providing the electrical signal to the battery module 15.

The photoelectric conversion module 13 herein converts the optical signal into the electrical signal which generally is an AC signal; the rectification module 14 converts the AC signal into a direct current (DC) signal suitable for charging the battery module, and then provide the DC signal to the battery module 15. The rectification module 14 includes a filter and a rectifying circuit, and the filter is electrically connected to the rectifying circuit. The filter is configured for filtering out the impurity signal of AC signal; the rectifying circuit is configured for converting the AC signal with the impurity signal being filtered out into a stable DC signal. The rectification module 14, for instance, can be a bridge circuit.

Function of other modules of the smart watch of the present embodiment is the same as the corresponding modules in the first embodiment; no further description will be given herein.

The working principle of the smart watch of the present embodiment is: the optical signal detection module 11 is configured for detecting and collecting the optical signal modulated by the optical signal modulator. After being demodulated by the optical signal demodulation module 12, converted by the photoelectric conversion module 13, and rectified by the rectification module 14, the optical signal is provided to the battery module 15 to rapidly charge the battery module 15 and a long battery life is ensured.

The concrete structure of the smart watch in the present embodiment is similar to the concrete structure of the smart watch in the first embodiment. Preferably, the rectification module 14 and the photoelectric conversion module 13 are integratedly packaged. By applying the above structure, the structure of the smart watch is enabled to become compact, the size of the smart watch is not necessary to be changed, therefore the small size and the portability of the smart watch can be guaranteed.

The wearable device provided by the present embodiment can collect, demodulate, conduct photoelectric conversion for and rectify the optical signal; the wearable device even can reuse light rays emitted from its display module. Therefore, rapid charging of the battery module of the wearable device can be realized, and a long battery life of the wearable device can be guaranteed. Without need to change the existing habits of users, the wearable device can realize high efficiency charging with the modulated light during a standby state or during being used indoors. Therefore, the problems of low charging efficiency, low battery life and charging inconvenience of the battery module of the wearable device are effectively solved, and the using time of the smart watch is prolonged.

Third Embodiment

The present embodiment provides a charging system which includes a wearable device and a charging device for the wearable device. The charging device comprises a light source configured for providing an optical signal, an optical signal modulator configured for receiving and modulating the optical signal, so as to convert the optical signal into modulated light, and a sending module configured for sending the modulated light which is served as part of the ambient light. The wearable device comprises: an optical signal detection module configured for detecting ambient light, an optical signal demodulation module configured for demodulating the modulated light in the ambient light to obtain demodulated light, a photoelectric conversion module configured for converting the demodulated light into an electrical signal, and a battery module configured for receiving the electrical signal, so as to be charged with the electrical signal.

For the charging system in accordance with the present embodiment, the charging device can be formed as a portable charging device, which can be separately disposed with the wearable device. The charging device is easy to be carried, so as to rapidly charge the wearable device whenever necessary. The endurance ability of the wearable device is guaranteed. In addition, high charging efficiency can be guaranteed with the modulated light being used for rapid charging.

It should be understand, the above embodiments are merely exemplary embodiments to illustrate the principle of the present disclosure, and the present disclosure will be not limited thereto. For those skilled in the art, modifications and improvements can be made to the disclosure without departing from the spirit and the scope of the present disclosure, the modifications and improvements should be within the scope of the disclosure.

What is claimed is:

1. A wearable device, comprising:
   an optical signal detection module, which is configured for detecting ambient light;
   an optical signal demodulation module, which is configured for demodulating modulated light in the ambient light to obtain demodulated light;
   a photoelectric conversion module, which is configured for converting the demodulated light into an electrical signal; and
   a battery module, which is configured for receiving the electrical signal, so as to be charged by the electrical signal,
   wherein the optical signal detection module comprises an optical signal sensing component, a control component, and an optical signal acquisition component, and
   wherein the optical signal sensing component is configured for sensing the ambient light, and the control component is configured for controlling the optical signal acquisition component to collect the ambient light when a light intensity of the ambient light sensed by the optical signal sensing component is larger than a preset threshold.

2. The wearable device according to claim 1, further comprising a display module which is configured for displaying information for a user of the wearable device, wherein
   the optical signal detection module is disposed outside the display module.

3. The wearable device according to claim 2, wherein an upper surface of the optical signal detection module protrudes from a plane where the display module is disposed.

4. The wearable device according to claim 3, wherein the wearable device is a smart watch.

5. The wearable device according to claim 2, wherein the wearable device is a smart watch.

6. The wearable device according to claim 1, further comprising: a rectification module, which is disposed between the photoelectric conversion module and the battery module and is configured for rectifying the electrical signal provided by the photoelectric conversion module, so as to adapt to a rated voltage of the battery module.

7. The wearable device according to claim 6, wherein the wearable device is a smart watch.

8. The wearable device according to claim 1, wherein the optical signal sensing component comprises a photodiode.

9. The wearable device according to claim 8, wherein the wearable device is a smart watch.

10. The wearable device according to claim 1, wherein the wearable device is a smart watch.

11. A charging device for the wearable device according to claim 1, comprising:
- a light source, which is configured for providing an optical signal;
- an optical signal modulator, which is configured for receiving and modulating the optical signal, so as to convert the optical signal into the modulated light; and
- a sending module, which is configured for sending the modulated light which is served as part of the ambient light.

12. The charging device according to claim 11, wherein the light source is a light-emitting diode.

13. A charging system, comprising: a wearable device according to claim 1 and a charging device for the wearable device, wherein the charging device comprises:
- a light source, which is configured for providing an optical signal;
- an optical signal modulator, which is configured for receiving and modulating the optical signal, so as to convert the optical signal into modulated light; and
- a sending module, which is configured for sending the modulated light which is served as part of ambient light, and the wearable device comprises:
- an optical signal detection module, which is configured for detecting ambient light;
- an optical signal demodulation module, which is configured for demodulating the modulated light in the ambient light to obtain demodulated light;
- a photoelectric conversion module, which is configured for converting the demodulated light into an electrical signal; and
- a battery module, which is configured for receiving the electrical signal, so as to be charged with the electrical signal.

14. The wearable device according to claim 1, wherein the wearable device is a smart watch.

* * * * *